(12) United States Patent
Yanai

(10) Patent No.: US 10,725,366 B2
(45) Date of Patent: Jul. 28, 2020

(54) LIGHT SOURCE APPARATUS AND PROJECTOR

(71) Applicant: SEIKO EPSON CORPORATION, Tokyo (JP)

(72) Inventor: Hiroaki Yanai, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/292,830

(22) Filed: Mar. 5, 2019

(65) Prior Publication Data

US 2019/0278162 A1 Sep. 12, 2019

(30) Foreign Application Priority Data

Mar. 6, 2018 (JP) .................................. 2018-039737

(51) Int. Cl.
G03B 21/20 (2006.01)
G02B 26/00 (2006.01)
G03B 21/00 (2006.01)
G03B 33/12 (2006.01)

(52) U.S. Cl.
CPC ......... G03B 21/204 (2013.01); G02B 26/008 (2013.01); G03B 21/208 (2013.01); G03B 21/006 (2013.01); G03B 33/12 (2013.01)

(58) Field of Classification Search
CPC ... G03B 21/204; G03B 21/208; G03B 26/008
USPC ......................................................... 362/84
See application file for complete search history.

(56) References Cited

U.S. PATENT DOCUMENTS

| 7,204,605 B2* | 4/2007 | Kanayama | H04N 9/3105 348/E9.027 |
| 2009/0180081 A1* | 7/2009 | Yanagisawa | G03B 33/12 353/37 |
| 2012/0133904 A1* | 5/2012 | Akiyama | G03B 33/06 353/38 |
| 2013/0038646 A1* | 2/2013 | Sakai | G03B 21/208 345/697 |
| 2015/0055667 A1* | 2/2015 | Horn | H01S 5/02208 372/36 |
| 2015/0377446 A1* | 12/2015 | Bhakta | G02B 27/0933 362/510 |

FOREIGN PATENT DOCUMENTS

| JP | 2012-118110 A | 6/2012 |
| JP | 2013-025215 A | 2/2013 |
| JP | 2106-518726 A | 6/2016 |

* cited by examiner

Primary Examiner — Bryon T Gyllstrom
(74) Attorney, Agent, or Firm — Oliff PLC

(57) ABSTRACT

A light source apparatus includes a light source section that includes a plurality of light emitting devices and outputs excitation light, a wavelength conversion element including a wavelength conversion layer having a rectangular light incident surface on which the excitation light outputted from the light source section is incident, a lens group that causes the excitation light to be incident on the light incident surface in such a way that an irradiation area irradiated with the excitation light has a rectangular shape on the light incident surface, and an adjuster that adjusts the position of the irradiation area relative to the position of the light incident surface by using a pivotal action around a first axis of rotation extending in a first direction perpendicular to the light incident surface.

14 Claims, 6 Drawing Sheets

LIGHT SOURCE APPARATUS AND PROJECTOR

BACKGROUND

1. Technical Field

The present invention relates to a light source apparatus and a projector.

2. Related Art

In recent years, attention has been directed to a light source apparatus using a laser light source and a phosphor as a light source apparatus for a projector. It is generally known that cooling a phosphor improves the fluorescence conversion efficiency thereof. To cool a phosphor, there is a configuration in which a rotary wheel on which a phosphor is formed is rotated.

The configuration using a rotary wheel, however, causes an increase in size of the phosphor and hence an increase in cost. In contrast, there is a known light source apparatus in which a fixed phosphor fixed onto a substrate is irradiated with laser light (see JP-A-2012-118110, for example).

In the case where a fixed phosphor is irradiated with excitation light, however, the area other than the area intended to be irradiated with the excitation light could undesirably also be irradiated with the excitation light. When the area other than the intended irradiation area is irradiated with the excitation light, there could undesirably be a decrease in the fluorescence conversion efficiency and breakage of the interface where the phosphor is boned to the substrate due to the incidence of the excitation light on the bonding interface.

SUMMARY

An advantage of some aspects of the invention is to provide a light source apparatus and a projector capable of preventing an area of a phosphor other than an area intended to be irradiated with excitation light from being irradiated with the excitation light.

A light source apparatus according to an aspect of the invention includes a light source section that includes a plurality of light emitting devices and outputs excitation light, a wavelength conversion element including a wavelength conversion layer having a rectangular light incident surface on which the excitation light outputted from the light source section is incident, a lens group that causes the excitation light to be incident on the light incident surface in such a way that an irradiation area irradiated with the excitation light has a rectangular shape on the light incident surface, and an adjuster that adjusts a position of the irradiation area relative to a position of the light incident surface by using a pivotal action around a first axis of rotation extending in a first direction perpendicular to the light incident surface.

In the light source apparatus according to the aspect of the invention, in which the position of the irradiation area relative to the position of the light incident surface is adjusted by using the pivotal action around the first axis of rotation, an area of the light incident area that is the area other than the irradiation area, which is irradiated with the excitation light, is not irradiated with the excitation light.

Therefore, since the excitation light is efficiently incident on the light incident surface of the wavelength conversion layer, a decrease in the fluorescence conversion efficiency in the wavelength conversion layer can be suppressed. Further, since no excitation light is incident on a side end portion of the wavelength conversion layer, breakage of the wavelength conversion layer due to accumulated heat or induced stress can be avoided.

A decrease in reliability of the wavelength conversion element due to the excitation light therefore lowers, whereby a highly reliable light source apparatus can be provided.

In the light source apparatus according to the aspect described above, it is preferable that the adjuster includes a first pivotal mechanism that causes the wavelength conversion element to pivot around the first axis of rotation.

According to the configuration described above, in which the wavelength conversion element is caused to pivot around the first axis of rotation, the position of the irradiation area can be readily adjusted with respect to the position of the light incident surface.

In the light source apparatus according to the aspect described above, it is preferable that the lens group includes a homogenizer system including a first multi-lens array including a plurality of rectangular first lenses that divide the excitation light into a plurality of sub-light fluxes and a second multi-lens array including a plurality of second lenses corresponding to the first lenses, and that the adjuster includes a second pivotal mechanism that causes the homogenizer system to pivot around a second axis of rotation extending in a second direction perpendicular to the first direction.

According to the configuration described above, in which the homogenizer system is caused to pivot around the second axis of rotation, the position of the irradiation area can be readily adjusted with respect to the position of the light incident surface.

In the light source apparatus according to the aspect described above, it is preferable that the second pivotal mechanism allows the homogenizer system to pivot around a third axis of rotation extending in a third direction perpendicular to the first and second directions.

According to the configuration described above, in which the homogenizer system is caused to pivot around the second and third axes of rotation, the position of the irradiation area can be more precisely adjusted with respect to the position of the light incident surface.

In the light source apparatus according to the aspect described above, it is preferable that the lens group includes a light collection system that collects the excitation light on the light incident surface, and that the adjuster includes a movement mechanism that moves the light collection system in a second direction perpendicular to the first direction and a third direction perpendicular to the first and second directions.

According to the configuration described above, in which the light collection system is moved in the second and third directions, the position of the irradiation area can be more precisely adjusted with respect to the position of the light incident surface.

In the light source apparatus according to the aspect described above, it is preferable that the movement mechanism is capable of moving the light collection system in the first direction.

According to the configuration described above, moving the light collection system in the first direction allows adjustment of the magnification factor at which the irradiation area to be magnified. The sizes of the irradiation area and the light incident surface are thus allowed to coincide with each other.

In the light source apparatus according to the aspect described above, it is preferable that a shape of the light incident surface is similar to a shape of the irradiation area irradiated with the excitation light.

According to the configuration described above, adjusting the magnification factor at which the irradiation area is so magnified by the lens group that the size of the light incident surface coincides with the size of the irradiation area allows the shape of the light incident surface to coincide with the shape of the irradiation area irradiated with the excitation light. The excitation light can thus be incident over the entire light incident surface.

According to a second aspect of the invention, a projector is provided. The projector includes the light source apparatus according to the aspect described above, a light modulator that modulates light from the light source apparatus in accordance with image information to form image light, and a projection optical apparatus that projects the image light.

The projector according to the second aspect, which includes the light source apparatus including the wavelength conversion element, which lowers a decrease in reliability thereof due to the excitation light, can display a highly reliable, high-luminance image.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below in detail with reference to the drawings.

Figure 1:
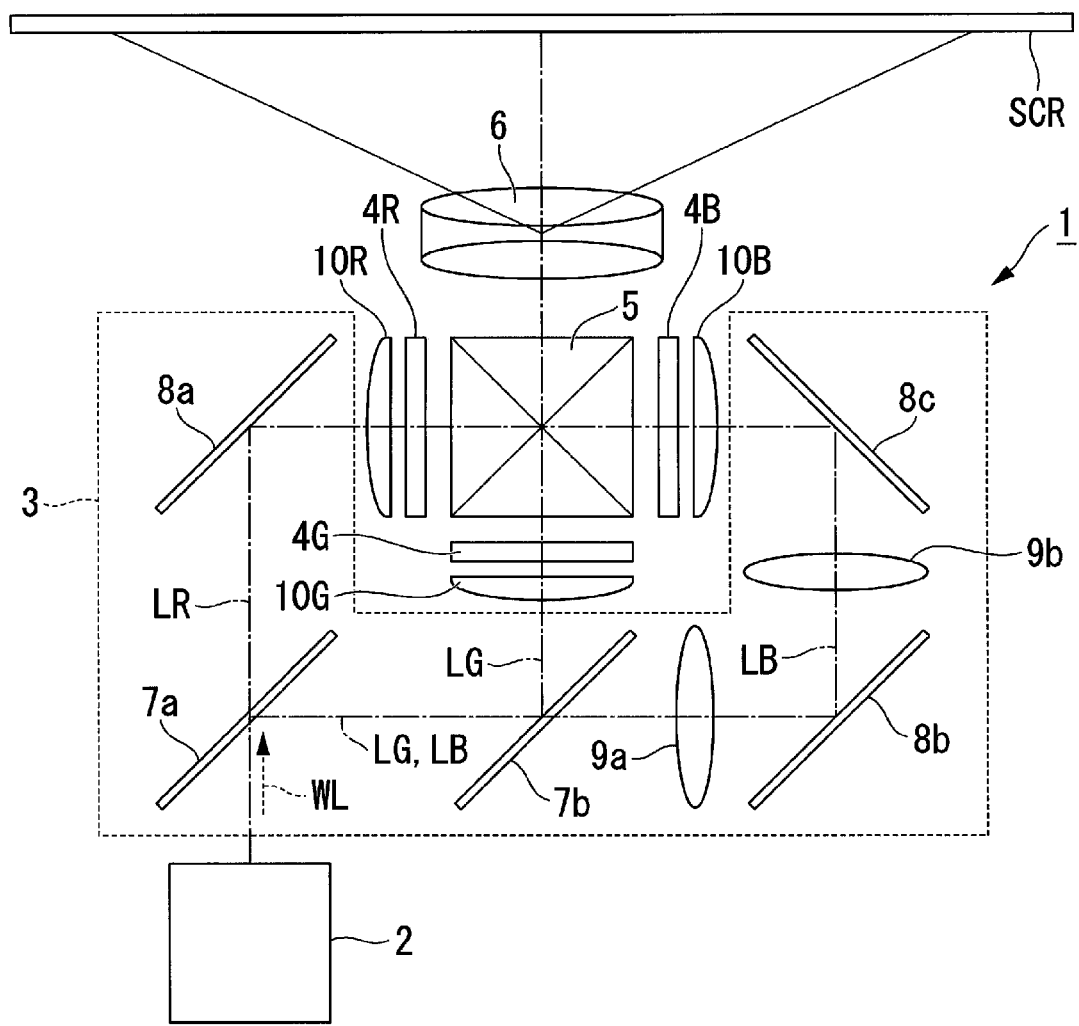
FIG. 1 shows a schematic configuration of a projector according to a first embodiment.

FIG. 1 shows a schematic configuration of a projector according to the present embodiment.

A projector 1 according to the present embodiment is a projection-type image display apparatus that displays color video images on a screen SCR, as shown in FIG. 1. The projector 1 includes a light source apparatus 2, a color separation system 3, light modulators 4R, 4G, and 4B, a light combining system 5, and a projection optical apparatus 6.

The color separation system 3 separates illumination light WL into red light LR, green light LG, and blue light LB. The color separation system 3 generally includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the illuminator 2 into the red light LR and the other light (green light LG and blue light LB). The first dichroic mirror 7a transmits the separated red light LR and reflects the other light (green light LG and blue light LB). On the other hand, the second dichroic mirror 7b reflects the green light LG and transmits the blue light LB to separate the other light into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and guide the blue light LB having passed through the second dichroic mirror 7b to the light modulator 4B. The green light LG is reflected off the second dichroic mirror 7b toward the light modulator 4G.

The first relay lens 9a and the second relay lens 9b are disposed in the optical path of the blue light LB and on the downstream side of the second dichroic mirror 7b.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each formed, for example, of a transmissive liquid crystal panel. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively. The field lenses 10R, 10G, and 10B parallelize the red light LR, the green light LG, and the blue light LB incident on the light modulators 4R, 4G, and 4B, respectively.

The image light fluxes from the light modulators 4R, 4G, and 4B enter the light combining system 5. The light combining system 5 combines the image light fluxes corresponding to the red light LR, the green light LG, and the blue light LB with one another and causes the combined image light to exit toward the projection optical apparatus 6. The light combining system 5 is formed, for example, of a cross dichroic prism.

The projection optical apparatus 6 is formed of a projection lens group, enlarges the combined image light from the light combining system 5, and projects the enlarged image light toward the screen SCR. Enlarged color video images are thus displayed on the screen SCR.

Light Source Apparatus

Figure 2:
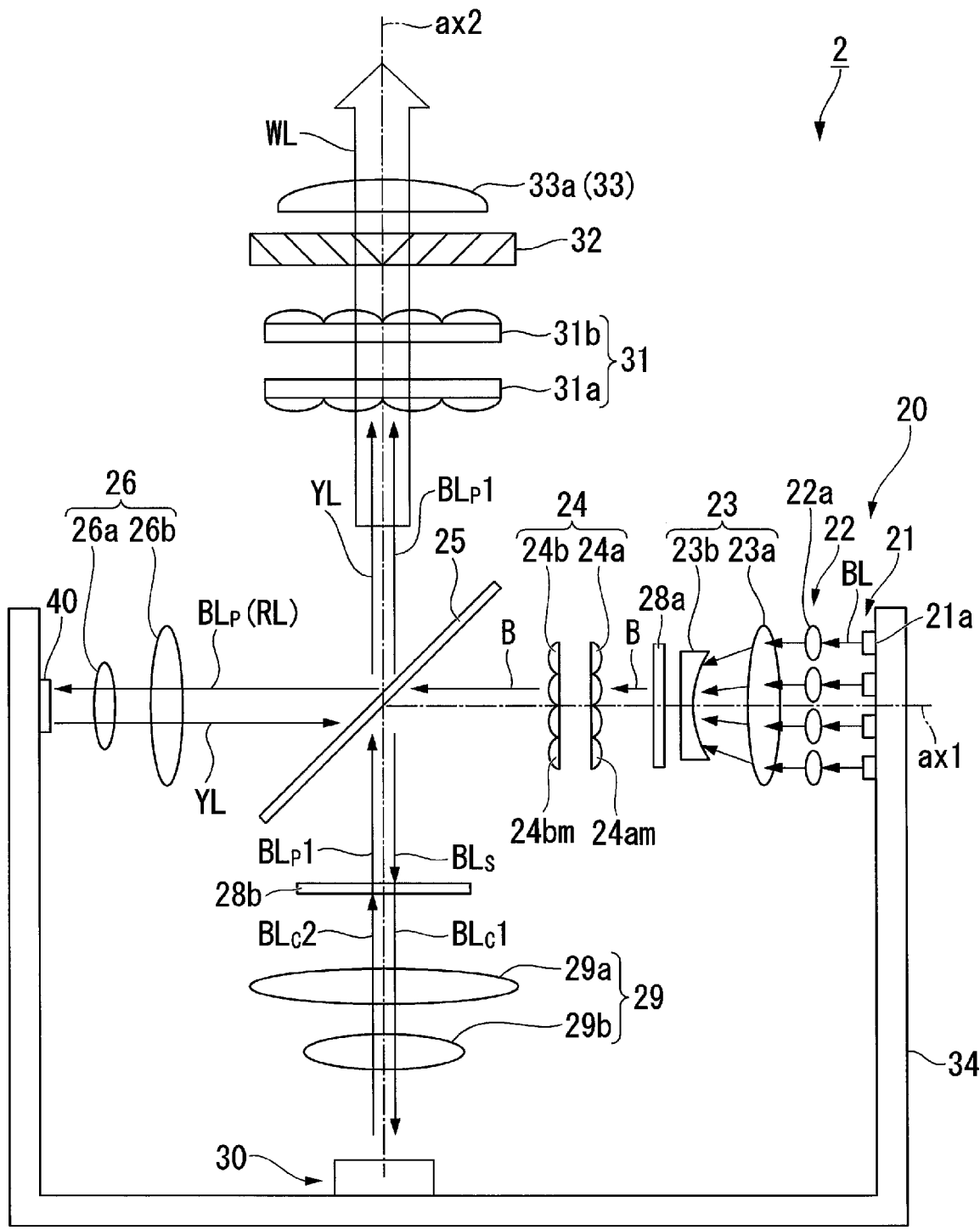
FIG. 2 shows a schematic configuration of a light source apparatus.

The light source apparatus 2 will subsequently be described. FIG. 2 shows a schematic configuration of the light source apparatus 2. The light source apparatus 2 includes a light source section 20, an afocal system 23, a first retardation film 28a, a homogenizer system 24, a polarization separation element 25, a first light collection system 26, a wavelength conversion element 40, a second retardation film 28b, a second light collection system 29, a diffusive reflection element 30, an optical integration system 31, a polarization conversion element 32, a superimposing lens 33a, and an enclosure 34, as shown in FIG. 2.

In the present embodiment, the optical integration system 31 and the superimposing lens 33a form a superimposing system 33.

The enclosure 34 forms the exterior of the light source apparatus 2 and the function as a support member that accommodates and supports the components of the light source apparatus 2. In the light source apparatus 2, the components are supported by a common support member (enclosure 34) and therefore arranged with high positional precision.

The light source section 20, the afocal system 23, the first retardation film 28a, the homogenizer system 24, the polarization separation element 25, the first light collection system 26, and the wavelength conversion element are so implemented in the enclosure 34 as to be sequentially arranged along an optical axis ax1. On the other hand, the diffusive reflection element 30, the second light collection system 29, the second retardation film 28b, the polarization separation element 25, the optical integration system 31, the polarization conversion element 32, and the superimposing lens 33a are so implemented in the enclosure 34 as to be sequentially arranged along an illumination optical axis ax2. The optical axis ax1 and the illumination optical axis ax2 are present in the same plane and perpendicular to each other.

The light source section 20 includes an array light source 21 and a collimator system 22. The array light source 21 includes a plurality of semiconductor lasers 21a. The plurality of semiconductor lasers 21a are arranged in an array in a plane perpendicular to the optical axis ax1. The semiconductor lasers 21a each output, for example, a blue light beam BL (laser light having intensity that peaks at wavelength of 460 nm, for example). In the present embodiment, the semiconductor lasers 21a correspond to the "light emitting device" in the appended claims. In the present embodiment, the semiconductor lasers 21a, which form the array light source 21, have a multi-package structure in which the plurality of semiconductor lasers 21a are encapsulated in a single package. The collimator system 22, which will be described later and is formed of a plurality of collimator lenses 22a, may be integrated with the multi-package structure.

The array light source 21 may instead have CAN package structures that encapsulate the individual semiconductor lasers 21a.

The direction along the light beam BL outputted from each of the semiconductor lasers 21a, that is, the direction in which the light beam BL is outputted is the direction along the optical axis ax1. The direction in which the light beam BL is outputted is parallel to the optical axis ax1.

The light beams BL outputted from the semiconductor lasers 21a enter the collimator system 22. The collimator system 22 converts the plurality of light beams BL outputted from the array light source 21 into parallelized light beams. The collimator system 22 is formed, for example, of a plurality of collimator lenses 22a arranged in an array. The plurality of collimator lenses 22a are disposed in correspondence with the plurality of semiconductor lasers 21a.

The light beams BL having passed through the collimator system 22 enter the afocal system 23. The afocal system 23 adjusts the light flux diameter of a blue light beam flux B including the plurality of light beams BL. The afocal system 23 is formed, for example, of a convex lens 23a and a concave lens 23b.

The blue light beam flux B having passed through the afocal system 23 is incident on the first retardation film 28a. The first retardation film 28a is, for example, a half wave plate configured to be rotatable. The light beams BL outputted from the semiconductor lasers 21a are each linearly polarized light. Appropriately setting the angle of rotation of the first retardation film 28a allows the blue light beam flux B including the light beams BL passing through the first retardation film 28a to contain an S-polarized component and a P-polarized component with respect to the polarization separation element 25 mixed with each other at a predetermined ratio. The ratio between the S-polarized component and the P-polarized component can be changed by rotating the first retardation film 28a.

The blue light beam flux B containing the S-polarized component and the P-polarized component produced when the blue light beam flux B passes through the first retardation film 28a enters the homogenizer system 24. The homogenizer system 24 cooperates with the first light collection system 26 to homogenize the illuminance distribution of the light incident on a phosphor layer 41 of the wavelength conversion element 40. The homogenizer system 24 further cooperates with the second light collection system 29 to homogenize the illuminance distribution of the light incident on the diffusive reflection element 30.

The homogenizer system 24 includes a first multi-lens array 24a and a second multi-lens array 24b. The first multi-lens array 24a includes a plurality of first lenses 24am for dividing the blue light beam flux B containing the S-polarized component and the P-polarized component and having passed through the afocal system 23 into a plurality of sub-light fluxes. The light incident surfaces of the plurality of first lenses 24am of the first multi-lens array 24a are optically conjugate with the light incident surface of the phosphor layer 41 of the wavelength conversion element 40, which will be described later. The first lenses 24am each have a rectangular planar shape. In the present embodiment, the first multi-lens array corresponds to the "multi-lens array" set forth in the appended claims, and the first lenses 24am correspond to the "lenslets" set forth in the appended claims.

The second multi-lens array 24b includes a plurality of second lenses 24bm corresponding to the plurality of first lenses 24am of the first multi-lens array 24a. The second lenses 24bm each have a rectangular planar shape, as do the first lenses 24am.

In the present embodiment, the blue light beam flux B having passed through the homogenizer system 24 is incident on the polarization separation element 25. The polarization separation element 25 is formed, for example, of a polarizing beam splitter having wavelength selectivity. The polarization separation element 25 inclines by 45° also with respect to the optical axis ax1 and the illumination optical axis ax2.

The polarization separation element 25 has a polarization separation function of separating the blue light beam flux B into a light beam flux BLs, which is formed of the S-polarized light component with respect to the polarization separation element 25, and a light beam flux BLp, which is formed of the P-polarized light component with respect to the polarization separation element 25. Specifically, the polarization separation element 25 reflects the light beam flux BLs, which is part of the blue light beam flux B and formed of the S-polarized light component, and transmits the light beam flux BLp, which is part of the blue light beam flux B and formed of the P-polarized light component.

The polarization separation element 25 further has a color separation function of transmitting fluorescence YL, which belongs to a wavelength band different from the wavelength band to which the blue light beam flux B belongs, irrespective of the polarization state of the fluorescence YL.

The light beam flux BLp formed of the P-polarized component and separated by the polarization separation element 25 enters the first light collection system 26. In the present embodiment, the first light collection system 26 is formed, for example, of lenses 26a and 26b. The light beam flux BLp having exited out of the first light collection system 26 is incident as excitation light in the form of a collected light flux on the wavelength conversion element 40. The light beam flux BLp is hereinafter referred to as excitation light RL.

Figure 3:
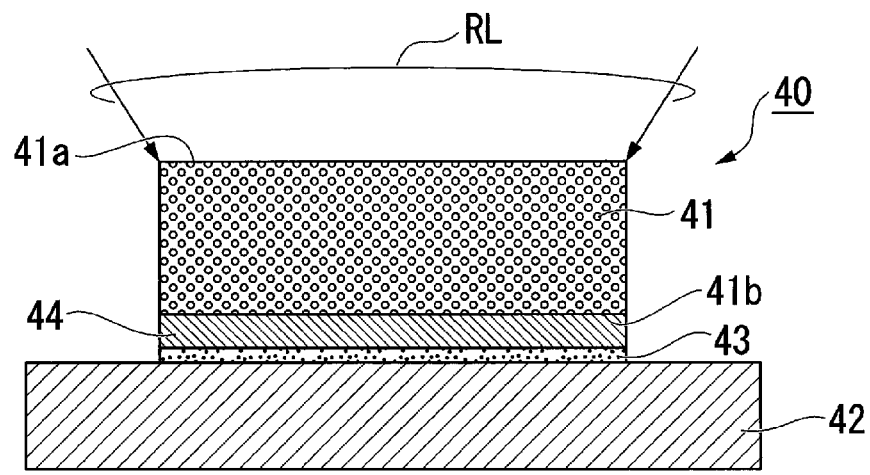
FIG. 3 is a cross-sectional view showing the configuration of key parts of a wavelength conversion element.
Figure 4:
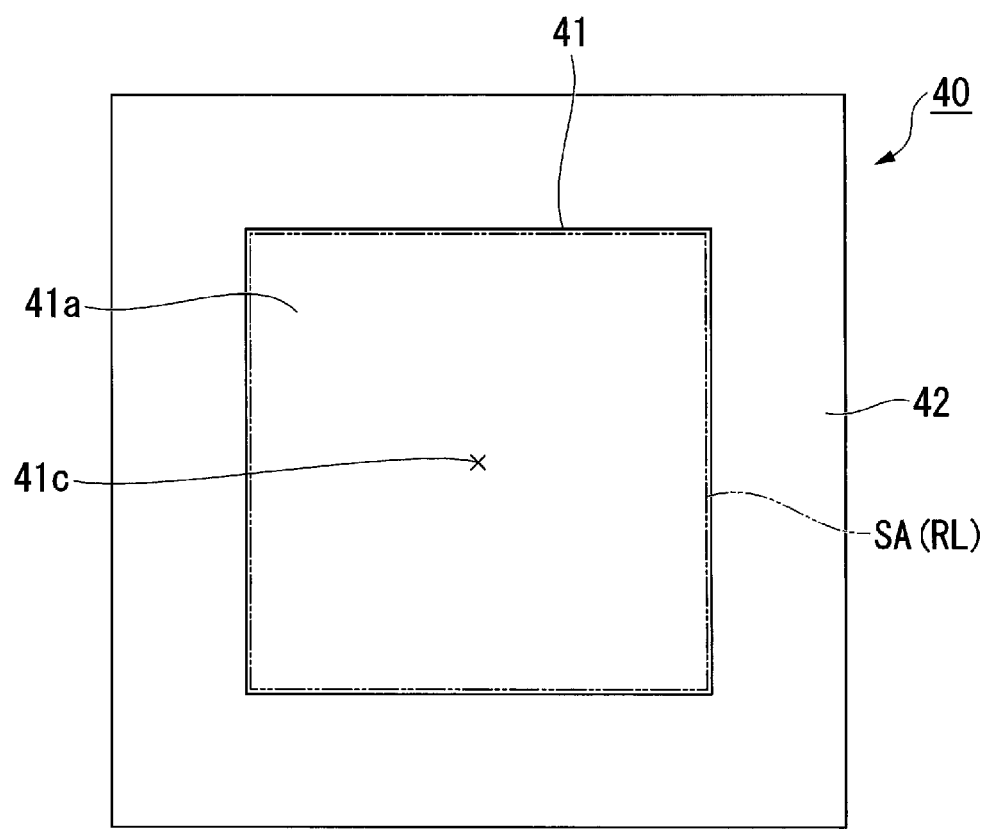
FIG. 4 is a plan view of the wavelength conversion element.

FIG. 3 is a cross-sectional view showing the configuration of key parts of the wavelength conversion element 40. FIG. 4 is a plan view of the wavelength conversion element 40.

The wavelength conversion element 40 includes the phosphor layer 41, a substrate 42, which supports the phosphor layer 41, a bonding material 43, which bonds and fixes the phosphor layer 41 to the substrate 42, and a reflector 44, as shown in FIG. 3. In the present embodiment, the wavelength conversion element 40 employs a fixed structure in which the phosphor layer 41 is so disposed as to be fixed onto the substrate 42. The wavelength conversion element 40 in the present embodiment therefore does not need to have strength ensuring thickness, unlike a phosphor used in a rotary-wheel wavelength conversion element, and the phosphor layer 41 can be thinner than a phosphor layer used in a rotary-wheel wavelength conversion element.

The phosphor layer 41 is formed of a YAG-ceramic-based phosphor produced by sintering a plurality of YAG phosphor particles. The phosphor layer 41 has a light incident surface 41*a*, on which the excitation light RL is incident, and a lower surface 41*b*, which is opposite the light incident surface 41*a*. The phosphor layer 41 corresponds to the "wavelength conversion layer" set forth in the appended claims.

In a plan view in which the light incident surface 41*a* of the phosphor layer 41 is viewed in the direction of a normal to the light incident surface 41*a* (hereinafter simply referred to as plan view), the phosphor layer 41 has a rectangular shape.

The reflector 44 is provided on a side of the phosphor layer 41 that is the side opposite the side on which the excitation light RL is incident, as shown in FIG. 3. The reflector 44 has the function of reflecting the fluorescence YL produced in the phosphor layer 41. For example, the reflector 44 is formed of a reflection film provided on a surface on a side of the phosphor layer 41 that is the side opposite the side on which the excitation light RL is incident.

The substrate 42 is preferably made, for example, of Al (aluminum), Cu (copper), or Ag (silver), which are each a metal having high thermal conductivity, or AlN, diamond, Al$_2$O$_3$, which are each a ceramic material. In the present embodiment, a copper plate is, for example, used as the substrate 42 from the viewpoint of high thermal conductivity. The surface of the substrate 42 may be plated or otherwise surface treated for an increase in bondability to the bonding material 43.

The bonding material 43 is, for example, an adhesive. To bond the phosphor layer 41 to the substrate 42, it is conceivable to use a bonding method other than using an adhesive, but the bonding method using an adhesive is superior to any other bonding method in consideration of cost and mass productivity.

The light source apparatus 2 according to the present embodiment homogenizes the illuminance distribution of the excitation light RL based on superimposition on the phosphor layer 41 via the homogenizer system 24 and the first light collection system 26. The homogenizer system 24 is so designed that the light beams having passed through the first lenses 24*am* pass through the corresponding second lenses 24*bm*. The excitation light RL having passed through the first lenses 24*am* and the second lenses 24*bm*, which correspond to each other, is incident on an irradiation area SA of the light incident surface 41*a*, as shown in FIG. 4.

In the present embodiment, since the light incident surface 41*a* of the phosphor layer 41 is optically conjugate with the light incident surfaces of the first lenses 24*am*, the irradiation area SA has a rectangular shape similar to the shape of the light incident surfaces of the first lenses 24*am*. That is, the homogenizer system 24 and the first light collection system 26 cause the excitation light RL to be incident on the light incident surface 41*a* in such a way that the irradiation area SA, which is irradiated with the excitation light RL, has the rectangular shape shown in FIG. 4 on the light incident surface 41*a*. In the present embodiment, the homogenizer system 24 and the first light collection system 26 correspond to the "lens group" set forth in the appended claims.

In the assembly of the light source apparatus 2, the positional relationship between the homogenizer system 24 and the first light collection system 26 is likely to deviate from an intended positional relationship to some extent (assembly error). Such an assembly error causes the irradiation area SA, which is irradiated with the excitation light RL, to deviate from the light incident surface 41*a* of the phosphor layer 41.

When the irradiation area SA deviates from the light incident surface 41*a*, the amount of excitation light RL incident on the light incident surface 41*a* decreases, resulting in a problem of a decrease in the fluorescence conversion efficiency in the phosphor layer 41. Further, there is another problem of incidence of the excitation light RL that is not incident on the light incident surface 41*a* on the side surface of the phosphor layer 41. The side surface of the phosphor layer 41 is a surface extending in the direction in which the excitation light RL travels. The side surface of the phosphor layer 41 is a surface parallel to the optical axis ax1. The side surface of the phosphor layer 41 is a surface extending in a first direction that will be described later and is perpendicular to the light incident surface 41*a*. The side surface of the phosphor layer 41 is a surface extending along a first axis of rotation, which will be described later.

In a case where the bonding material 43 is not provided over the full area between the phosphor layer 41 and the substrate 42, heat transfer from the phosphor layer 41 to the substrate 42 is insufficient at the periphery of the phosphor layer 41. As a result, heat could be accumulated in the phosphor layer 41, or the difference in the coefficient of linear expansion between the phosphor layer 41 and the substrate 42 could produce stress that breaks the phosphor layer 41.

Since the phosphor layer 41 is typically formed in a rectangular shape in a dicing-based cutting process, the side surface of the phosphor layer 41, that is, the surface cut in the dicing process has minute cracks. Therefore, when the excitation light RL is incident on the side surface of the phosphor layer 41 (surface cut in dicing process), the magnitude of the stress acting on the side surface increases, causing the side surface to be likely to break.

Further, the excitation light RL incident on the bonding material 43 degrades the bonding material 43, resulting in a possibility of separation of the phosphor layer 41 from the substrate 42.

Deviation of the irradiation area SA from the light incident surface 41*a* as described above lowers the reliability of the wavelength conversion element 40.

To avoid the problems described above, it is conceivable to employ a phosphor layer 41 having a larger light incident surface 41*a* in consideration of the deviation of the position of the irradiation area SA. In this case, however, the size of the phosphor layer 41 increases, resulting in an increase in the cost of the phosphor layer 41.

Figure 5:
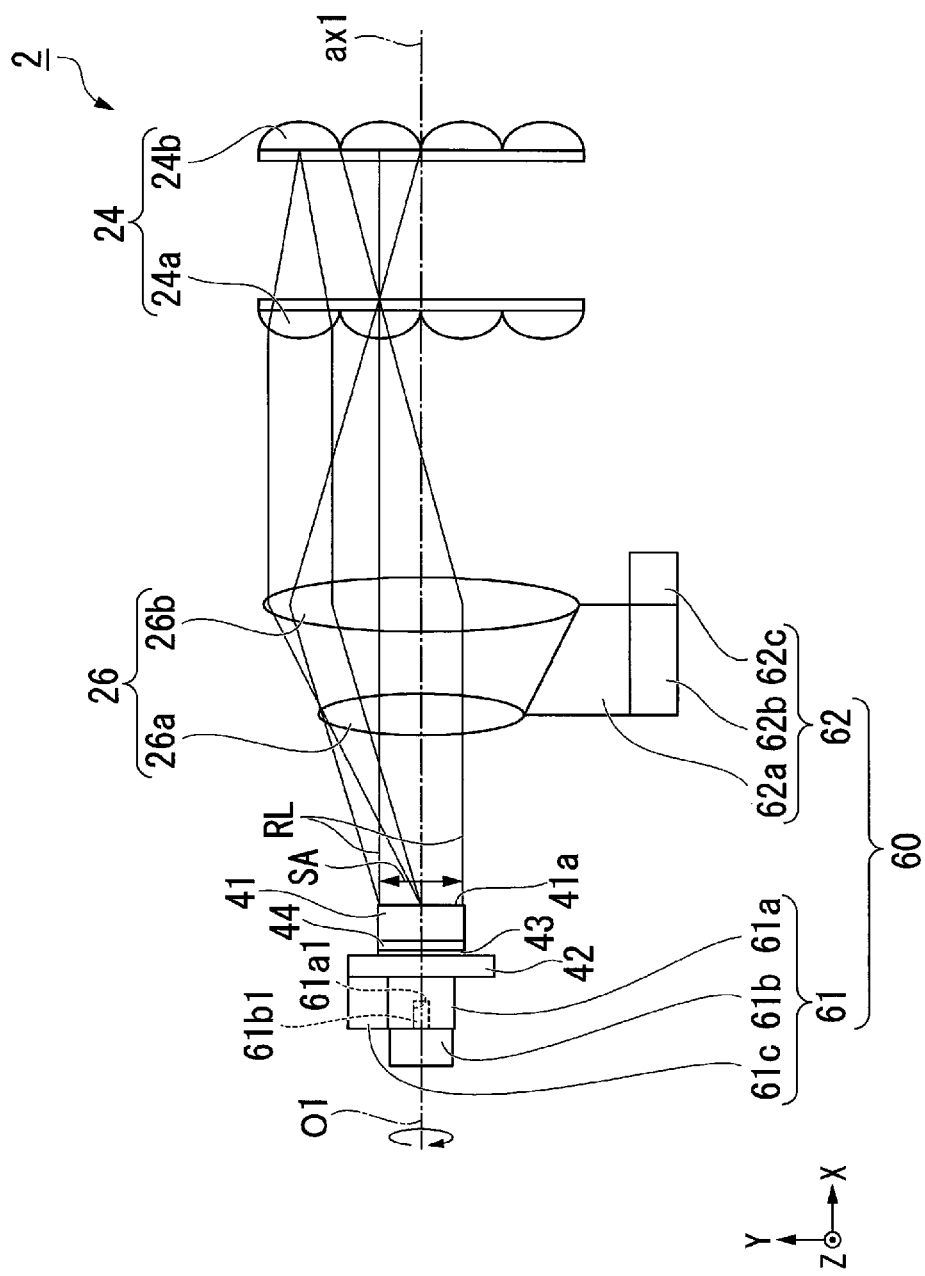
FIG. 5 shows key parts of the light source apparatus.

FIG. 5 shows key parts of the light source apparatus 2 that are disposed along the optical axis ax1. In FIG. 5, the description will be made by using an XYZ coordinate system as necessary. In FIG. 5, it is assumed that the direction X extends along the optical axis ax1, the direction Y extends along the illumination optical axis ax2, and the direction Z is perpendicular to the directions X and Y. In FIG. 5, the light source section 20, the afocal system 23, the first retardation film 28*a*, the polarization separation element 25, and the enclosure 34 are omitted.

The light source apparatus 2 according to the present embodiment includes an adjuster 60, which adjusts the position of the irradiation area SA relative to the light incident surface 41*a*, as shown in FIG. 5. The adjuster 60 adjusts the position of the irradiation area SA relative to the light incident surface 41*a* by using pivotal motion of pivoting around a first axis of rotation O1, which extends in the direction X (first direction) perpendicular to the light incident surface 41*a*.

In the present embodiment, the adjuster 60 includes a first pivotal mechanism 61, which causes the wavelength conversion element 40 to pivot around the first axis of rotation O1. The first pivotal mechanism 61 includes a base 61*a*, which supports the wavelength conversion element 40, a support 61*b*, and a fixer 61*c*.

The support 61*b*, which includes a shaft 61*b*1 inserted into a hole 61*a*1 provided in the base 61*a*, pivotably supports the base 61*a* around the first axis of rotation O1. The first axis of rotation O1 is an axis passing through the center 41*c* (see FIG. 4) of the phosphor layer 41 (light incident surface 41*a*).

The fixer 61*c* fixes the position of the base 61*a* in the rotational direction, for example, by clamping an end portion of the base 61*a*. The thus configured first pivotal mechanism 61 can position the wavelength conversion element 40 in a predetermined position.

In the light source apparatus 2 according to the present embodiment, the components of which are supported by the common support member (enclosure 34) as described above, the wavelength conversion element 40 can be disposed in a predetermined position with high precision after the first pivotal mechanism 61 rotates the wavelength conversion element 40.

In the present embodiment, the adjuster 60 further includes a movement mechanism 62, which moves the first light collection system 26 in the direction X, which is perpendicular to the light incident surface 41*a*, in the direction Y (second direction), which is perpendicular to the direction X, and in the direction Z (third direction), which is perpendicular to the directions X and Y. That is, in the light source apparatus 2 according to the present embodiment, the position of the first light collection system 26 can be adjusted in the directions X, Y, and Z (three directions).

The movement mechanism 62 includes a support 62*a*, which supports the first light collection system 26, a stage 62*b*, which can move the support 62*a* in the three directions X, Y, and Z, and a fixing mechanism 62*c*. The fixing mechanism 62*c* can fix the position of the support 62*a*, for example, by clamping feed screws that feed the stage 62*b* in the three directions.

The thus configured movement mechanism 62 can position the first light collection system 26 in a predetermined position. The movement mechanism 62 moves the lenses 26*a* and 26*b*, which form the first light collection system 26, integrally with each other to reduce a positional shift between the lenses 26*a* and 26*b* that occurs when the first light collection system 26 is moved.

Since the components of the light source apparatus 2 according to the present embodiment are supported by the common support member (enclosure 34) as described above, the first light collection system 26 is disposed in a predetermined position with high precision in the light source apparatus 2 after the movement mechanism 62 moves the first light collection system 26.

The adjuster 60 in the present embodiment can therefore adjust, with the aid of the movement mechanism 62, the size and position of the irradiation area SA relative to those of the light incident surface 41*a* by moving the position of the first light collection system 26 in the directions X, Y, and Z relative to the light incident surface 41*a* of the phosphor layer 41.

Further, the adjuster 60 in the present embodiment can adjust, with the aid of the first pivotal mechanism 61, the position of the irradiation area SA relative to the position of the light incident surface 41*a* by rotating the light incident surface 41*a* of the phosphor layer 41 around the first axis of rotation O1.

Figure 6:
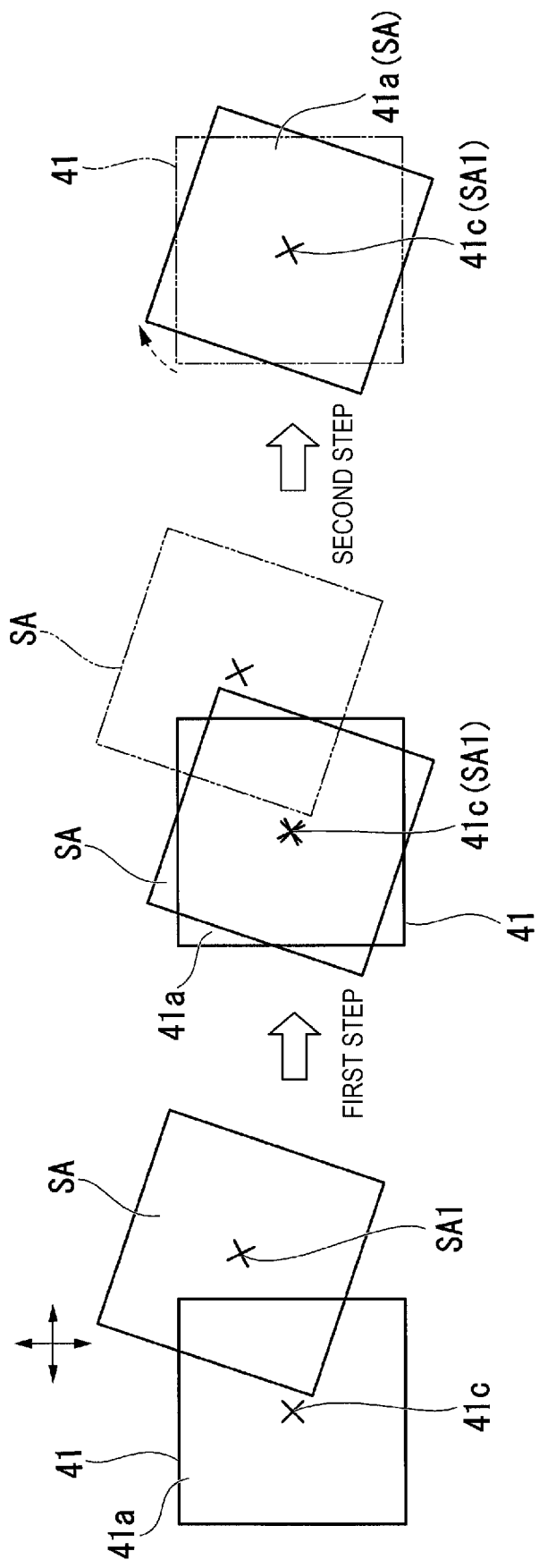
FIG. 6 describes a method for adjusting the position of an irradiation area relative to a light incident surface.

How the adjuster 60 in the present embodiment adjusts the position of the irradiation area SA relative to the light incident surface 41*a* will be described below with reference to FIG. 6.

The movement mechanism 62 first moves the first light collection system 26 to cause the center 41*c* of the light incident surface 41*a* to coincide with the center SA1 of the irradiation area SA and further causes the size of the light incident surface 41*a* to coincide with the size of the irradiation area SA (first step).

In the present embodiment, the shape of the light incident surface 41*a* is similar to the shape of the irradiation area SA irradiated with the excitation light RL. The movement mechanism 62 can therefore move the first light collection system 26 in the direction X to adjust the magnification factor at which the irradiation area SA is so magnified that the size of the light incident surface 41*a* coincides with the size of the irradiation area SA. The shape of the light incident surface 41*a* is thus allowed to coincide with the shape of the irradiation area SA irradiated with the excitation light RL.

The first pivotal mechanism 61 subsequently rotates the wavelength conversion element 40 to rotate the light incident surface 41*a* around the first axis of rotation O1. In the present embodiment, since the light incident surface 41*a* is rotated in the state in which the centers of the light incident surface 41*a* and the irradiation area SA coincide with each other, the rotation causes no deviation of the center of the light incident surface 41*a* from the center of the irradiation area SA. Since the shape of the light incident surface 41*a* roughly coincides with the shape of the irradiation area SA at this point, a state in which the outer shape of the irradiation area SA is roughly superimposed on the outer shape of the light incident surface 41*a* is achieved, that is, a state in which no excitation light RL is incident on an area of the light incident surface 41*a* that is the area other than the irradiation area SA irradiated with the excitation light RL is achieved (second step).

On the other hand, the light beam flux BLs formed of the S-polarized component and separated by the polarization separation element 25 is incident on the second retardation film 28*b*. The second retardation film 28*b* is formed of a quarter wave plate disposed in the optical path between the polarization separation element 25 and the diffusive reflection element 30. The light beam flux BLs is converted by the second retardation film 28b, for example, into right-handed circularly polarized light, which then enters the second light collection system 29. The light beam flux BLs formed of right-handed circularly polarized light is hereinafter referred to as blue light BLc1.

In the present embodiment, the second light collection system 29 is formed, for example, of lenses 29a and 29b. The blue light BLc1 having entered the second light collection system 29 is incident on the diffusive reflection element 30 in the form of collected blue light.

The diffusive reflection element 30 diffusively reflects the blue light BLc1 having exited out of the second light collection system 29 toward the polarization separation element 25. The diffusive reflection element 30 preferably not only reflects the blue light BLc1 in a Lambertian reflection scheme but does not disturb the polarization state of the blue light BLc1.

The light diffusively reflected off the diffusive reflection element 30 is hereinafter referred to as blue light BLc2. According to the present embodiment, diffusively reflecting the blue light BLc1 results in blue light BLc2 having a roughly uniform illuminance distribution. For example, the right-handed circularly polarized blue light BLc1 is reflected in the form of left-handed circularly polarized blue light BLc2.

The blue light BLc2 is converted by the second light collection system 29 into parallelized light and then incident on the second retardation film 28b again. The left-handed circularly polarized blue light BLc2 is converted by the second retardation film 28b into P-polarized blue light BLp1. The P-polarized blue light BLp1 passes through the polarization separation element 25 and travels toward the optical integration system 31.

The blue light BLp1 is thus used along with the fluorescence YL reflected off the polarization separation element 25 to form the illumination light WL. That is, the blue light BLp1 and the fluorescence YL exit out of the polarization separation element 25 in the same direction to form the white illumination light WL, which is the mixture of the blue light BLp1 and the fluorescence (yellow light) YL.

The illumination light WL exits toward the optical integration system 31. The optical integration system 31 is formed, for example, of a lens array 31a and a lens array 31b. The lens arrays 31a and 31b are each formed of a plurality of lenslets arranged in an array.

The illumination light WL having passed through the optical integration system 31 is incident on the polarization conversion element 32. The polarization conversion element 32 is formed of polarization separation films and retardation films. The polarization conversion element 32 converts the illumination light WL containing the non-polarized fluorescence YL into linearly polarized light.

The illumination light WL having passed through the polarization conversion element 32 enters the superimposing lens 33a. The superimposing lens 33a cooperates with the optical integration system 31 to homogenize the illuminance distribution of the illumination light WL in an area illuminated therewith. The light source apparatus 2 thus produces the illumination light WL.

In the light source apparatus 2 according to the present embodiment, the area other than the irradiation area SA, which is irradiated with the excitation light RL, is not irradiated with the excitation light RL by adjustment of the position of the irradiation area SA relative to the light incident surface 41a, as described above. Therefore, since the excitation light RL is efficiently incident on the light incident surface 41a, a decrease in the fluorescence conversion efficiency in the phosphor layer 41 can be suppressed.

Further, since the phosphor layer 41 in the present embodiment can be thinner than a rotary-wheel phosphor layer, occurrence of bleeding in which the fluorescence YL generated in the phosphor layer 41 propagates in the in-plane direction can be suppressed. Therefore, loss of the fluorescence YL due to the bleeding can be reduced, and the fluorescence YL can be efficiently used.

Further, since the excitation light RL is unlikely to be incident on the side surface of the phosphor layer 41 because an area of the light incident surface 41a that is the area other than the irradiation area SA, which is irradiated with the excitation light RL, is not irradiated with the excitation light RL, the amount of heat generated in the phosphor layer 41 by the light incident on the side surface thereof can be reduced. Breakage of the phosphor layer 41 due to the generated heat can be avoided. Further, since degradation of the bonding material 43 due to the excitation light RL can be suppressed, separation of the phosphor layer 41 from the substrate 42 can be avoided.

The light source apparatus 2 according to the present embodiment, which lowers a decrease in reliability of the wavelength conversion element 40 due to the excitation light RL, can therefore be a highly reliable light source apparatus 2.

Further, since an area of the light incident surface 41a that is the area other than the irradiation area SA, which is irradiated with the excitation light RL, is not irradiated with the excitation light RL, a positional shift of the irradiation area SA does not need to be considered. That is, since the size of the light incident surface 41a can be reduced, resulting in a decrease in the size of the phosphor layer 41. The decrease in the size of the phosphor layer 41 can therefore lower the cost of the wavelength conversion element 40.

Since the functions of the adjuster 60 in the present embodiment are separated and assigned to the movement mechanism 62, which moves the first light collection system 26 in the directions X, Y, and Z, and the first pivotal mechanism 61, which rotates the wavelength conversion element 40 around the direction X, the positions of the light incident surface 41a and the irradiation area SA can be adjusted with a simpler mechanism than in a case where the movement mechanism and the rotation mechanism are achieved by a single mechanism, whereby the manufacturing cost of the adjuster 60 can be lowered.

If the positions of the first light collection system 26 and the wavelength conversion element 40 are adjusted in the directions X, Y, and Z, and then the angular positions of the first light collection system 26 and the wavelength conversion element 40 are adjusted separately, the rotation around each of the axes of rotation causes the positions of the first light collection system 26 and the wavelength conversion element 40 to undesirably shift from the adjusted positions again. In contrast, the adjuster 60 in the present embodiment, in which the position adjustment mechanism (movement mechanism 62) and the rotation adjustment mechanism (first pivotal mechanism 61) are separate from each other, is very effective also in workability and precision.

The light source apparatus 2 according to the present embodiment, which efficiently produces the fluorescence YL, can therefore produce bright illumination light WL. Further, the projector 1 according to the present embodiment, which includes the light source apparatus 2 described above, can display a high-luminance image.

Second Embodiment

A light source apparatus according to a second embodiment of the invention will subsequently be described. In the following description, configurations and members common to those of the light source apparatus 2 according to the first embodiment have the same reference characters, and detailed descriptions of the common configurations and members will be omitted or simplified.

Figure 7:
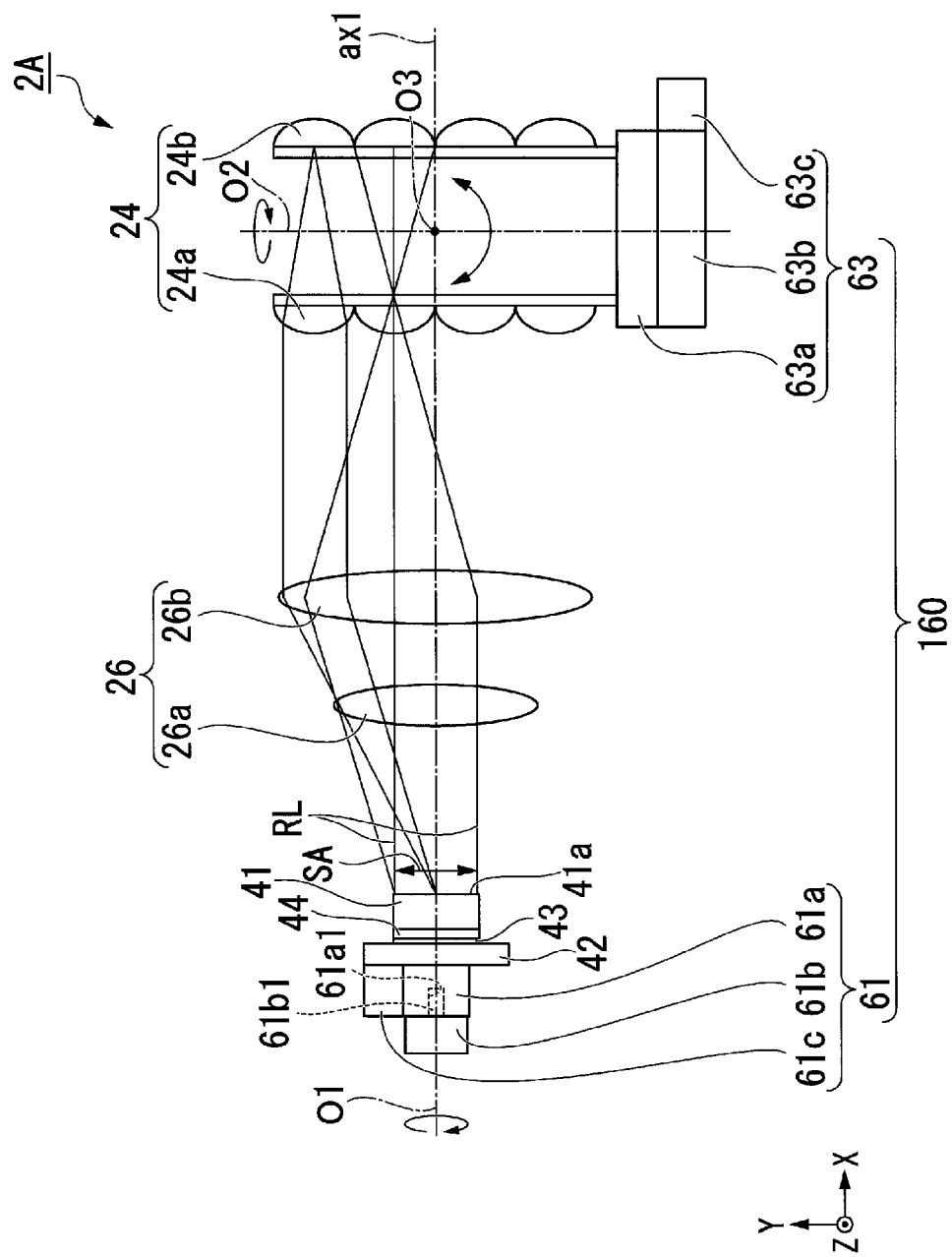
FIG. 7 shows the configuration of key parts of a light source apparatus according to a second embodiment.

FIG. 7 shows the configuration of key parts of a light source apparatus 2A according to the present embodiment. In FIG. 7, the description will be made by using an XYZ coordinate system. In FIG. 7, it is assumed that the direction X extends along the optical axis ax1, the direction Y extends along the illumination optical axis ax2, and the direction Z is perpendicular to the directions X and Y.

The light source apparatus 2A according to the present embodiment includes an adjuster 160, which adjusts the position of the irradiation area SA relative to the light incident surface 41a, as shown in FIG. 7. The adjuster 160 in the present embodiment includes the first pivotal mechanism 61 and a second pivotal mechanism 63.

The second pivotal mechanism 63 allows the homogenizer system 24 to pivot around a second axis of rotation O2, which extends in the direction Y (second direction) perpendicular to the direction X, and around a third axis of rotation O3, which extends in the direction Z (third direction) perpendicular to the directions X and Y. The second pivotal mechanism 63 includes a support 63a, which supports the homogenizer system 24, a pivotal section 63b, which causes the support 63a to pivot around the second axis of rotation O2 and a third axis of rotation O3, and a fixer 63c.

It is noted that in the homogenizer system 24, the positional relationship between the first multi-lens array 24a and the second multi-lens array 24b is important. To maintain the positional relationship, the second pivotal mechanism 63 moves the first multi-lens array 24a and the second multi-lens array 24b, which form the homogenizer system 24, integrally with each other to maintain the positional relationship therebetween. The movement of the first multi-lens array 24a and the second multi-lens array 24b therefore causes no positional shift therebetween.

The fixer 63c fixes the position of the support 63a, for example, by clamping an end portion of the support 63a. The thus configured second pivotal mechanism 63 can position the homogenizer system 24 in a predetermined position.

Since the components of the light source apparatus 2A according to the present embodiment are supported by the common support member (enclosure 34) as in the first embodiment, the homogenizer system 24 is disposed in a predetermined position with high precision in the light source apparatus 2A after the second pivotal mechanism 63 rotates the homogenizer system 24.

The adjuster 160 in the present embodiment can adjust, with the aid of the first pivotal mechanism 61, the position of the irradiation area SA relative to the position of the light incident surface 41a by rotating the light incident surface 41a of the phosphor layer 41 around the first axis of rotation O1.

Further, the adjuster 160 in the present embodiment can adjust, with the aid of the second pivotal mechanism 63, the position of the irradiation area SA relative to the position of the light incident surface 41a by rotating the homogenizer system 24 around the second axis of rotation O2 and the third axis of rotation O3.

How the adjuster 160 in the present embodiment adjusts the position of the irradiation area SA relative to the light incident surface 41a will be described below.

The second pivotal mechanism 63 first causes the homogenizer system 24 to pivot to cause the center of the excitation light RL to coincide with the center 41c of the light incident surface 41a. In this process, pivotal motion of the homogenizer system 24 pivots around the second axis of rotation O2 and the third axis of rotation O3 changes the angle of incidence at which the excitation light RL having exited out of the homogenizer system 24 is incident on the first light collection system 26.

The position where the excitation light RL is collected by the first light collection system 26 corresponds to the angle of incidence of the excitation light RL. The second pivotal mechanism 63 can therefore move the irradiation area SA in the direction Z relative to the light incident surface 41a by causing the homogenizer system 24 to pivot around the second axis of rotation O2. Further, the second pivotal mechanism 63 can move the irradiation area SA in the direction Y relative to the light incident surface 41a by causing the homogenizer system 24 to pivot around the third axis of rotation O3. The center of the excitation light RL is thus allowed to coincide with the center 41c of the light incident surface 41a. In the present embodiment, it is assumed that the magnification of the first light collection system 26 is so set that the size of the light incident surface 41a coincides with the size of the irradiation area SA.

The first pivotal mechanism 61 subsequently rotates the wavelength conversion element 40 to rotate the light incident surface 41a around the first axis of rotation O1. In the present embodiment, the light incident surface 41a is rotated in the state in which the center 41c of the light incident surface 41a coincides with the center SA1 of the irradiation area SA, so that the state in which the outer shape of the irradiation area SA is roughly superimposed on the outer shape of the light incident surface 41a is achieved. That is, the amount of excitation light RL incident on the area other than the irradiation area SA irradiated with the excitation light RL can be reduced.

In the light source apparatus 2A according to the present embodiment, the area other than the irradiation area SA, which is irradiated with the excitation light RL, is not irradiated with the excitation light RL by adjustment of the position of the irradiation area SA relative to the light incident surface 41a, as in the first embodiment.

Further, since the functions of the adjuster 160 in the present embodiment are separated and assigned to the movement mechanism (second pivotal mechanism 63), which moves the position of the irradiation area SA relative to the light incident surface 41a in the directions X and Y, and the first pivotal mechanism 61, which rotates the wavelength conversion element 40 around the direction X, the positions of the light incident surface 41a and the irradiation area SA can be adjusted with a simpler mechanism than in a case where the movement mechanism and the rotation mechanism are achieved by a single mechanism, whereby the manufacturing cost of the adjuster 160 can be lowered. The adjuster 160 also excels in workability and precision.

The light source apparatus 2A according to the present embodiment, which efficiently produces the fluorescence YL, can therefore produce bright illumination light WL. Further, the projector including the light source apparatus 2A can form a high-luminance image.

The invention is not limited to the contents of the embodiments described above but can be changed as appropriate to the extent that the change does not depart from the substance of the invention.

For example, the above embodiments have been described with reference to the case where the light source apparatus according to the embodiments of the invention is incorporated in a projector, but not necessarily. The light source apparatus according to each of the embodiments of the invention may be used as a lighting apparatus, a headlight of an automobile, and other components.

The entire disclosure of Japanese Patent Application No. 2018-039737, filed on Mar. 6, 2018 is expressly incorporated by reference herein.

What is claimed is:

1. A light source apparatus comprising:
a light source section that includes a plurality of light emitting devices and outputs excitation light;
a wavelength conversion element including a wavelength conversion layer having a rectangular light incident surface on which the excitation light outputted from the light source section is incident;
a lens group that causes the excitation light to be incident on the light incident surface in such a way that an irradiation area irradiated with the excitation light has a rectangular shape on the light incident surface; and
an adjuster that adjusts a position of the irradiation area relative to a position of the light incident surface by using a pivotal action around a first axis of rotation extending in a first direction perpendicular to the light incident surface.

2. The light source apparatus according to claim 1, wherein the adjuster includes a first pivotal mechanism that causes the wavelength conversion element to pivot around the first axis of rotation.

3. A projector comprising:
the light source apparatus according to claim 2;
a light modulator that modulates light from the light source apparatus in accordance with image information to form image light; and
a projection optical apparatus that projects the image light.

4. The light source apparatus according to claim 1, wherein the lens group includes a homogenizer system including a first multi-lens array including a plurality of rectangular first lenses that divide the excitation light into a plurality of sub-light fluxes and a second multi-lens array including a plurality of second lenses corresponding to the first lenses, and
the adjuster includes a second pivotal mechanism that causes the homogenizer system to pivot around a second axis of rotation extending in a second direction perpendicular to the first direction.

5. The light source apparatus according to claim 4, wherein the second pivotal mechanism allows the homogenizer system to pivot around a third axis of rotation extending in a third direction perpendicular to the first and second directions.

6. A projector comprising:
the light source apparatus according to claim 5;
a light modulator that modulates light from the light source apparatus in accordance with image information to form image light; and
a projection optical apparatus that projects the image light.

7. A projector comprising:
the light source apparatus according to claim 4;
a light modulator that modulates light from the light source apparatus in accordance with image information to form image light; and
a projection optical apparatus that projects the image light.

8. The light source apparatus according to claim 1, wherein the lens group includes a light collection system that collects the excitation light on the light incident surface, and
the adjuster includes a movement mechanism that moves the light collection system in a second direction perpendicular to the first direction and a third direction perpendicular to the first and second directions.

9. The light source apparatus according to claim 8, wherein the movement mechanism is capable of moving the light collection system in the first direction.

10. A projector comprising:
the light source apparatus according to claim 9;
a light modulator that modulates light from the light source apparatus in accordance with image information to form image light; and
a projection optical apparatus that projects the image light.

11. A projector comprising:
the light source apparatus according to claim 8;
a light modulator that modulates light from the light source apparatus in accordance with image information to form image light; and
a projection optical apparatus that projects the image light.

12. The light source apparatus according to claim 1, wherein a shape of the light incident surface is similar to a shape of the irradiation area irradiated with the excitation light.

13. A projector comprising:
the light source apparatus according to claim 12;
a light modulator that modulates light from the light source apparatus in accordance with image information to form image light; and
a projection optical apparatus that projects the image light.

14. A projector comprising:
the light source apparatus according to claim 1;
a light modulator that modulates light from the light source apparatus in accordance with image information to form image light; and
a projection optical apparatus that projects the image light.

* * * * *